United States Patent Office 3,441,425
Patented Apr. 29, 1969

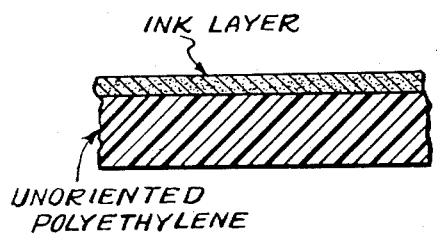
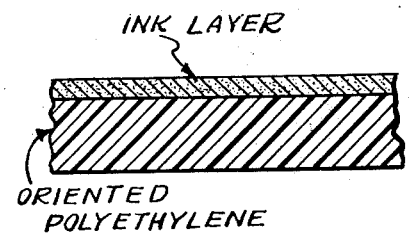

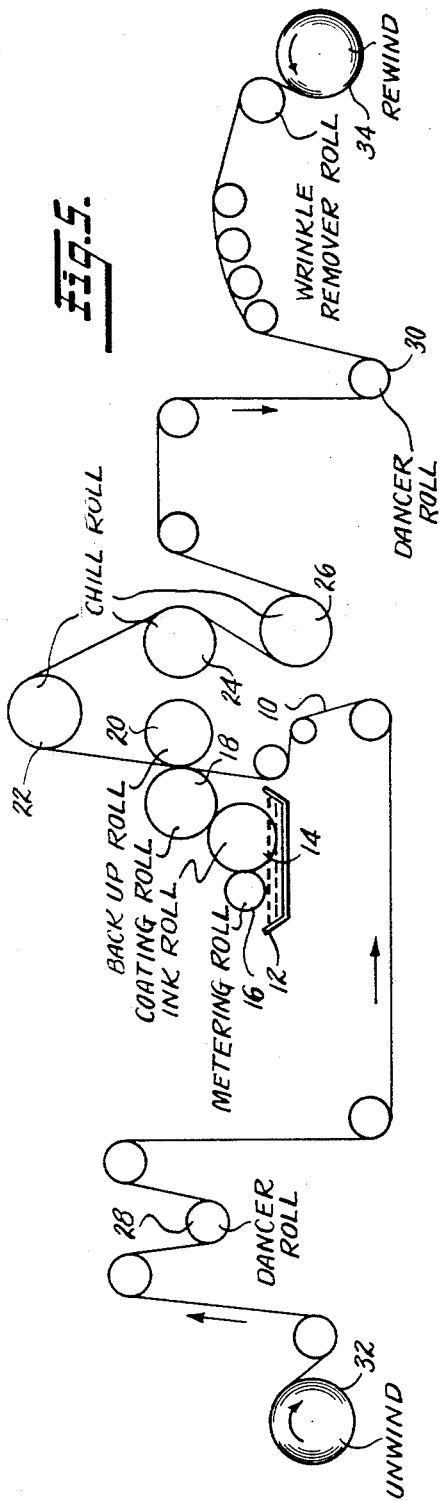
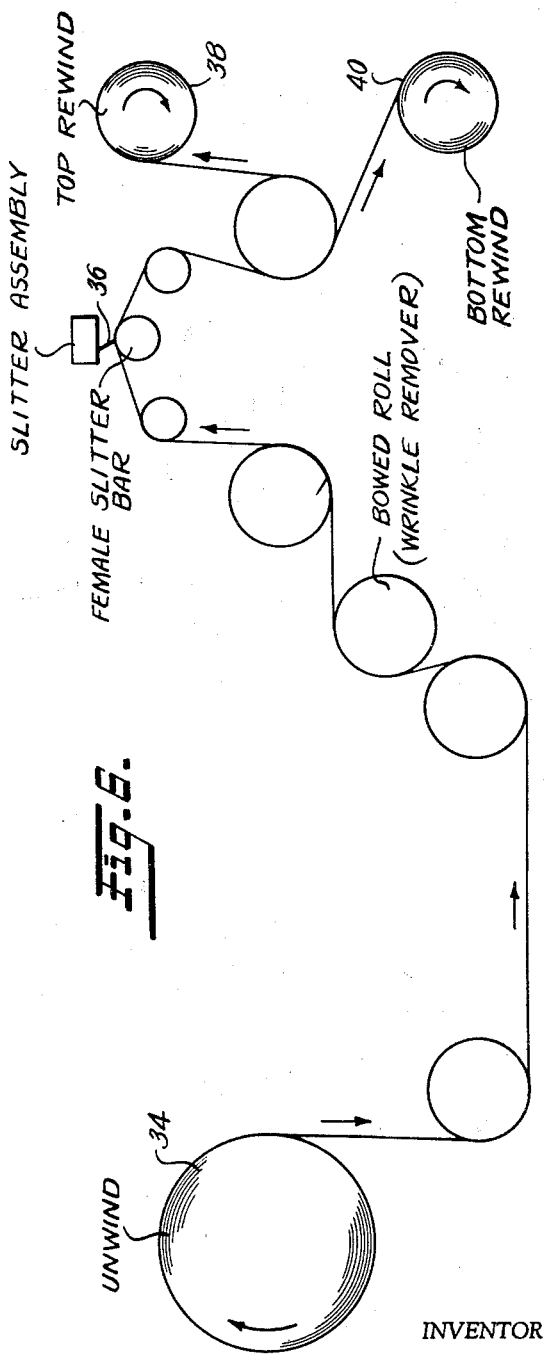

3,441,425
PRESSURE-SENSITIVE, INK-TRANSFER ARTICLES AND PROCESS FOR PREPARING SAME
Milton Richlin, Philadelphia, Pa., assignor to Olivetti Underwood Corporation, New York, N.Y., a corporation of Delaware
Filed July 30, 1965, Ser. No. 476,209
Int. Cl. B41j *31/05;* B41c *1/06;* B44d *1/28*
U.S. Cl. 117—36.1                                          15 Claims

ABSTRACT OF THE DISCLOSURE

Ink transfer articles, such as one-use typewriter ribbons, having improved ink release characteristics are provided by using unoriented, low-density polyethylene as the base film for the ink and by applying the ink to the film in such manner that there is substantially no orientation of the film during the coating and winding operations.

---

This invention relates to improved pressure-sensitive, ink-transfer articles and to a process for preparing same, and in particular, relates to improved ink-transfer sheets and ribbons comprising unoriented polyolefin film and to a process for producing such articles.

Ink-transfer tapes and ribbons, for typewriter use and other applications, having a thermo-plastic film base or foundation and an ink-transfer or release layer are well known in the art. These are sometimes referred to as one-use materials in contrast to inked fabrics which can be used time and again. The present invention relates to improved one-use materials of the known type. The one-use materials have numerous advantages. Thus, the solid ink layer does not penetrate through the film and clog up the typewriter bars and copy can be produced, which has well defined sharp outline, without the fuzziness and ink splattering attendant the use of liquid ink impregnated fabric ribbons. The print is also uniform throughout. In other words, each image character has substantially the same appearance.

It has been proposed to use continuous film foundations of cellophane, cellulose acetate, polyethylene, Mylar (polyethylene terphthalate polyester), and the like for ink-transfer tapes and ribbons. Inked polyethylene ribbons are commercially available. These ribbons are conventionally made by the continuous application of an ink coating, as by known hot melt coating techniques, or from reverse roll, gravure roll, use of metering rod, solvent deposition, etc., either at room temperature or elevated temperature to a film of oriented high density polyethylene. The products are generally acceptable in the art, but do not always provide complete release of the ink layer in the desired image area, especially when the transfer is to plastic or other impervious or high gloss materials. Dimensional stability has also been a problem.

In order to obtain dimensional stability of a roll of plastic film to which a hot melt coating has been applied and thereby avoid loose windings and other undesirable properties, one process, as described in U.S. Patent No. 3,061,886, involves prolonged heat treatment of the coated roll for a period not less than 20 hours to cause the film to relax and sag, following which the film is rewound under controlled temperature and tension.

It has now been found that an improved ink-transfer article of the type described can be produced without the necessity of the heat stabilizing step, by using a particular type of polyethylene for the base film and by processing it through the coating and other process operations in a controlled manner. One aspect of the invention resides in the use of a molecularly unoriented polyolefin film and in the processing of this film through the coating, slitting and winding operations in such a manner that no substantial orientation is given the film during the processing. Quite unexpectedly, the release characteristics of the inked layer from such a base film is materially improved with respect to release characteristics from a base film of oriented polyolefin. This is particularly noticeable when the image transfer is on difficultly printable material such as highly calendered paper, Mylar and other plastics, and other high gloss materials.

Low density, unoriented polyethylene film of a thickness of approximately 0.75 to 1.5 mils is the preferred base material. Unoriented polypropylene, when used as ink-transfer foundations, also exhibits improved ink release characteristics with respect to oriented polypropylene and the use of this material is considered within the scope of the present invention, although the greatest overall advantage and preferred product is obtained through the use of low density, unoriented polyethylene.

Low density polyethylene and high density polyethylene, as known to the art, have well recognizable and considerably different characteristics. The low density polyethylene is characterized by a moderate amount of side chain branching existing in the polymer molecule, which also accounts for the non-linearity of the material. On the other hand, high density polyethylene is characterized by very little side chain branching and exhibits a high degree of linearity. In comparison with the low density polyethylene, high density polyethylene exhibits higher tensile strength, is less permeable to gas and vapors, is more chemically resistant, and exhibits greater stability at elevated temperatures. For this reason, high density polyethylene has been used for the production of tapes of the type with which the present invention is concerned.

Both low density and high density polyethylene can be molecularly oriented and this orientation has been considered desirable for materials to be used for pressure-sensitive tape purposes. In contrast, the present invention utilizes low density, substantially unoriented polyethylene.

The low density unoriented polyethylene film employed by the present invention may be obtained commercially from a number of sources. It is usually made by flat film casting techniques with low takeoff speeds and in which a minimum of stretching and calendering of the finished film is applied. It is further characterized as having a tensile strength of less than 3500 pounds per square inch in either direction as tested by ASTM method D882–61–T. Oriented film on the other hand, usually has a tensile strength of greater than 3500 pounds per square inch in at least one direction. X-ray diffraction patterns of the unoriented film utilized for the present invention show substantially unbroken rings (see Renfrew et al.—Polyethylene, Iliffe & Sons Ltd., London, 1960, Plate 5.1, page 112).

Low density polyethylene generally exhibits a melting point in the range of about 230° to 240° F., has an average density of about 0.91 to about 0.93 and side chain branching occurring in the proportion of about one side chain per 20 carbon atoms in the main carbon branch. The melting point of high density polyethylene is higher, usually in the range of about 260° to 270° F. It has an average density, ordinarily ranging from about 0.95 to 0.97. The occurrence of side chain branching in high density polyethylene is about 1/10 or less of the side chain branching occurring in a low density polyethylene. Because of its higher melting point, the high density polyethylene has also been considered desirable for use in hot melt coating operations. The present invention, in one embodiment, provides a means whereby the lower melting, low density, unoriented polyethylene can be coated with hot melt materials without substantial alteration of the surface coating and without destroying the desired release characteristics of the coating. The invention, however, is not limited to use of hot melt materials. Improved transfer articles are obtained through the use of low density unoriented polyethylene with ink release coatings of other types including magnetic type inks which may, for example, be solvent deposited.

Typical compositions which are applied by hot melt techniques have the general formula:

|  | Parts by wt. |
| --- | --- |
| Vegetable wax | 30–40 |
| Mineral oil | 25–40 |
| Carbon black | 10–15 |
| Dyes, organic toners, etc. | 0–20 |
| Paraffin wax | 0–20 |
| Dye solvent, fillers, etc. | 0–20 |

It will be understood that these ingredients are compounded in selected proportions to provide a composition which is semi-plastic and substantially dry to the touch at room temperature and which will adhere to polyethylene film to provide a release coating thereon. The formula may be varied to suit the purposes of the particular transfer article being manufactured. Other waxes, pigments, dyes and fillers may be substituted as desired.

Typical magnetic type inks for solvent deposition on the film have the general formula:

|  | Parts by wt. |
| --- | --- |
| Iron oxide | 40–60 |
| Resin | 10–25 |
| Plasticizing oil | 15–35 |
| Solvent, as needed. | |

The resin can be, for example, polystyrene, vinyl acetate-chloride copolymer, cellulose acetate butyrate, ethyl, cellulose, or nitrocellulose or other film formers known in the art. The plasticizing oil can be one of various vegetable, animal or mineral oils, or synthetic plasticizers, or combinations having compatibility with the resin component. The solvent used is one having good solvency for the selected resin.

It is an object of the invention to provide a pressure-sensitive, ink-transfer article of improved ink release properties.

Another object of the invention is to provide an improved pressure-sensitive, ink-transfer article having a polyolefin base film which does not need to be specially treated for dimensional stabilization after the coating operation.

Another object of the invention is to provide a process for producing an improved pressure-sensitive, ink-transfer article utilizing a polyolefin base film.

A still further object of the invention is to provide a process for hot melt coating relatively low melting, unoriented, low density polyethylene without substantial alteration of the surface of the film being coated.

A still further object of the invention is to provide a process for hot melt coating unoriented, low density, polyethylene film without materially affecting the surface being coated and without imparting substantial orientation to the film during the coating operation.

A still further object of the invention is to provide a one-use typewriter ribbon having materially improved ink release properties and to provide a process for producing such ribbon with a minimum of processing steps.

These and other objects and advantages of the invention will be further understood by reference to the ensuing description and accompanying drawings wherein:

FIG. 1 is a diagrammatic cross-section, on an enlarged scale, of an unoriented polyethylene base transfer ribbon made in accordance with the present invention.

FIG. 1–A is a diagrammatic cross-section, similar to FIG. 1, of a conventional transfer ribbon having a base of oriented polyethylene.

FIG. 2 is an enlargement of the letters "QW" typed on Mylar engineering paper by a typewriter transfer ribbon having an unoriented polyethylene backing as shown in FIG. 1.

FIG. 2–A is a view, similar to FIG. 2, of the letters "QW" typed on Mylar engineering paper by a typewriter transfer ribbon having an oriented polyethylene backing as shown in FIG. 1–A.

FIG. 3 is an enlargement of the letters "QW" typed on highly calendered translucent paper designed for the diazo process, known as "Ozaclear" engineering paper, by a typewriter transfer ribbon having an unoriented polyethylene backing as shown in FIG. 1.

FIG. 3–A is a view, similar to FIG. 3, of the letters "QW" typed on the same "Ozaclear" engineering paper as shown in FIG. 3, but with a typewriter ribbon having an oriented polyethylene backing as shown in FIG. 1–A.

FIG. 4 is an enlargement of the letters "qw" typed on letterhead paper by a typewriter transfer ribbon having an unoriented polyethylene backing as shown in FIG. 1.

FIG. 4–A is an enlargement of the letters "qw" typed on the same letterhead paper as shown in FIG. 4, but with a typewriter ribbon having an oriented polyethylene backing as shown in FIG. 1–A.

FIG. 5 is a diagrammatic elevational view of a typical system which can be used for applying a hot melt ink coating to the unoriented, low density polyethylene film of the invention.

FIG. 6 is a diagrammatic elevational view of a typical slitting operation which can be used in the process of the present invention.

In the conventional hot melt ink coating operation for high density oriented polyethylene, the hot melt composition is applied to the film at a temperature of about 180° to 210° F. to provide a coating of e.g. about 0.05 to 0.3 mil thickness. The coating is applied to a relatively wide strip of film, e.g. 20–26 inches in width, as it is passed continuously through the coating station from one roll to another, following which, after heat treatment of the coated wide roll for dimensional stabilization (during which intentional stretching of the coated film occurs), the wide roll is again unwound and the coated film passed through a slitting station for subdivision into a plurality of narrow strips which are wound on receiving reels to provide the final product. Considerable tension is applied to the film in the coating and slitting operations.

One embodiment of the process of the present invention, comprises applying a hot melt ink coating composition, as described above to one surface of a strip of substantially unoriented, low density polyethylene film having a thickness of approximately 0.75 to 1.5 mils while simultaneously contacting the other surface of the polyethylene film with a surface having a temperature below that of the hot melt composition being applied. For example, the hot melt as applied to one surface of the moving film may be at a temperature in the range of about 180° to 210° F. while the back surface of the film is contacted with a surface having a temperature in the range of about 140° to 170° F. and preferably in the range of about 145° to 155° F. This temperature differential is critical with the unoriented, low density polyethylene of the invention, both from the standpoint of providing the desired release characteristics of the ink coating, prevention of sticking of the film to the machine surfaces, and prevention of softening of the film which may result in an undesirable amount of stretching and orientation.

The coated film is rewound and passed through the slitting machine without the necessity of heat stabilization. However, minimum tension is applied to the film, especially in the slitting operation to avoid stretching and orientation of the film.

Referring now to the drawings, it will be seen that the difference between FIGS. 1 and 1–A resides in the base material underlying the ink layer. The base material in FIG. 1 is unoriented, low density polyethylene whereas in FIG. 1–A, it is an oriented polyethylene. The article shown in FIG. 1 is representative of that produced in accordance with the process of the invention, whereas the article of FIG. 1–A is representative of a conventional high density polyethylene base typewriter ribbon produced by the practice generally employed at present in the art. Both films were coated with a hot melt, wax-base ink of the same composition, but with the use of different temperatures during the coating operation. The hot melt had the following formula:

| | Parts by wt. |
|---|---|
| Carnauba wax | 35 |
| Paraffin oil, 100 SSU at 100° F. | 26 |
| Channel black | 10 |
| Organic black toner | 18 |
| Methyl violet base | 1 |
| Paraffin wax, refined, 136°–138° F. M.P. | 10 |
| | 100 |

CONVENTIONAL OPERATION

The material represented by FIG. 1–A was produced from oriented, high density polyethylene film having the following characteristics:

| | | |
|---|---|---|
| Gauge | mil | 0.75 |
| Tensile strength: | | |
| Minimum (MD) | p.s.i | 5000 |
| Minimum (XD) | p.s.i | 1700 |
| Density approximately | | 0.95 |
| Melting point, ° F. | | 260–270 |

The film was coated by the process diagrammatically illustrated in FIG. 5 wherein the pigmented wax-base hot melt ink was applied to one surface of the film 10 from an ink reservoir 12 by means of ink roll 14, metering roll 16, coating roll 18 and back-up roll 20. In this process, the ink and the rolls 14, 16, 18 and 20 were maintained at approximately 200° F. The coated film was passed to chill rolls 22, 24 and 26 where it was chilled sufficiently to permit rewinding without blocking. Tension was applied to the continuously moving film by controlling the release of the film from unwind roll 32 to rewind roll 34. In the conventional process, the amount of tension is not critical and is usually well above the minimum required to ensure proper passage of the film from unwind roll 32 to rewind roll 34. The finished roll 34 was then subjected to a baking process for a prolonged time period for dimensional stabilization and after cooling was subdivided into a plurality of separate small rolls by passage through a conventional slitting machine as illustrated in FIG. 6. In such machine, the coated film was unwound from the roll 34, passed continuously through a parallel series of slitters 36 and was rewound as individual ribbons 38 and 40 of smaller width. A substantial amount of tension is usually applied to the film in this operation.

Example 1

The material represented by FIG. 1 was produced from cast, unoriented, low density polyethylene film having the following characteristics:

| | | |
|---|---|---|
| Gauge | mil | 1.0 |
| Tensile strength: | | |
| (MD) | p.s.i | 3000 |
| (XD) | p.s.i | 2000 |
| Density approximately | | 0.92 |
| Melting point, ° F. | | 230–240 |

This film was coated by the process illustrated diagrammatically in FIG. 5 with the same hot melt ink composition as used for the article of FIG. 1–A. However, in this process, the backing roll 20 in contact with the back surface of the film 10 opposite the point of application of the hot melt composition was maintained at a temperature of approximately 145° to 155° F. This performed the dual function of preventing alteration of the surface of the film to which the hot melt composition was applied, thereby avoiding alteration of the desired release characteristics of the ink from the film, of preventing sticking of the film to the back-up roll, and of softening and weakening of the film with attendant excessive stretch. The hot melt ink in this operation, as well as the rolls 14, 16 and 18, were maintained at a temperature of approximately 200° F. If the back-up roll temperature is too low, ink-transfer and adhesion of the coating to the film will be adversely affected. If too high, ink-release characteristics as well as mechanical difficulties, and poor product quality, may ensue.

A further variation in the processing technique for the material of FIG. 1 was application of minimum tension on the film during the slitting operation. The tension was controlled to that point where smooth operation was ensured without appreciable stretching of the film. No heat treatment of the roll 34 between coating and slitting operations was employed. Nevertheless, the finished roll of coated film was sufficiently dimensionally stable that no difficulty was encountered with loose cores or other typewriter feeding and handling problems.

The differences in the printing characteristics of the conventional tape and that made in accordance with Example 1 of the invention is strikingly illustrated in FIGS. 2–4 and FIGS. 2–A–4–A of the drawings. The type in FIGS. 2–4 is generally bolder, blacker and more uniform than that in FIGS. 2–A through 4–A. In particular, it will be noted that there are areas 50, 52 and 54 on the type reproduced in FIG. 2–A which represent areas in which the ink-layer was not completely released from the base material. Such failure to release is not evident in the type reproduced in FIG. 2.

The conventional oriented polyethylene tape showed very poor release on the Ozaclear paper as will be seen from FIG. 3–A whereas release on this paper was very good from the unoriented polyethylene tape as will be seen in FIG. 3.

FIG. 4–A shows that the release on the letterhead paper was much less satisfactory with the conventional oriented polyethylene tape than with the unoriented material. Thus, the type reproduced in FIG. 4–A is pale and shows areas such as at 56, of complete failure to release whereas the type reproduced in FIG. 4 shows uniform release of the inked composition and a much sharper, darker print.

It is believed that the unoriented film exhibits greater plasticity and greater hysteresis, and thus improved type conformational ability, than the oriented film. It is also believed that a non-linear film, such as provided by the cast, low density polyethylene, transmits the impact energy along the branches of the molecular structure.

EXAMPLE 2

A typewriter ribbon was produced from unoriented polypropylene film having the following characteristics:

| | | |
|---|---|---|
| Gauge | mil | 0.87 |
| Tensile strength: | | |
| (MD) | p.s.i | 5000 |
| (XD) | p.s.i | 4500 |

This film was coated with a hot melt ink of the same composition as in Example 1 and by using substantially the same processing techniques as in the conventional operations. The resulting ribbon upon printing showed substantially improved ink release characteristics as compared to a tape produced from biaxially oriented polypropylene film of 0.75 mil thickness having a tensile strength of 9000 p.s.i. (MD) and 35,000 p.s.i. (XD).

EXAMPLE 3

Unoriented low density polyethylene film having the properties given in Example 1 was coated with a magnetic ink having the following composition:

| | Parts by wt. |
|---|---|
| Iron oxide (IRN–100 Pfizer) | 60 |
| Polystyrene (Styron 666) | 10 |
| Castor oil | 30 |
| Toluene | 150 |

The ingredients of the ink were milled to provide a homogeneous mixture in the solvent and the resulting ink was applied to room temperature to a wide roll of the film by means of an applicator roll and leveling bar. The coated roll was passed through an oven at a temperature of about 120° to 150° F. for a sufficient time to evaporate the solvent. The coated film was then slit into narrower width with care to avoid undue tension on the film. The resulting coated ribbons were dimensionally stable and exhibited superior ink release characteristics as compared to the same ink on oriented polyethylene. Undesirable bridging of closely spaced magnetic symbols (such as are used for example in some banking systems) which frequently occurs with magnetic inks released from high density oriented and other film foundations is substantially eliminated when unoriented low density polyethylene is used for the magnetic ink foundation. Greater accuracy in sorting cards, checks, etc. by magnetic principles based on the magnetic ink information thereon is thereby ensured.

It will be understood that the invention has been illustrated by reference to representative coating and slitting operations but that the invention is not limited to the exact systems disclosed. It will be apparent that various substitutions and changes may be employed without departing from the spirit and scope of the invention. It is the intention, therefore, that the invention be limited only as indicated by the scope of the following claims:

I claim:

1. A pressure-sensitive, ink-transfer sheet comprising a substantially unoriented polyolefin film of about 0.75 to 1.5 mil thickness having an ink-transfer coating on one surface thereof.

2. The transfer sheet defined in claim 1 wherein the substantially unoriented polyolefin film is low density polyethylene having a maximum tensile strength in either direction below about 3500 pounds per square inch.

3. A typewriter ribbon comprising a low density, substantially unoriented polyethylene film of about 0.75 to 1.5 mil thickness having a maximum tensile strength in either direction below about 3500 pounds per square inch and having an ink-transfer coating on one surface thereof.

4. The article defined in claim 1 wherein the ink-transfer coating is a pigmented, wax base, hot melt composition.

5. The article defined in claim 1 wherein the ink-transfer coating is a magnetic ink.

6. The article defined in claim 1 wherein the ink-transfer coating is a solvent-deposited ink.

7. A process for producing a pressure-sensitive, ink-transfer strip comprising coating a strip of substantially unoriented, low density polyolefin film having a thickness of approximately 0.75 to 1.5 mils with an ink-transfer coating composition while said film is passing from an unwind roll through the coating station to a rewind roll, and maintaining a tension on the film between said rolls which is less than that which would cause substantial orientation of the film during the coating and rewinding operation.

8. The process of claim 7 wherein the ink-transfer coating is deposited from a solvent.

9. The process of claim 7 wherein the ink-transfer coating is a magnetic ink.

10. The process of claim 7 including the step of passing the rewound strip through a slitting station to provide a plurality of strips of lesser width, and applying a tension to the film which is less than that which would cause substantial orientation of the film during the slitting operation.

11. A process for producing a pressure-sensitive, ink-transfer strip comprising applying a hot melt, pigmented, wax-base coating composition to one surface of a strip of substantially unoriented, low density polyethylene film having a thickness of approximately 0.75 to 1.5 mils, simultaneously contacting the other surface of said polyethylene film with a surface having a temperature below that of the hot melt composition being applied while said film is passing from an unwind roll through the coating station to a rewind roll, and maintaining a tension on the film between said rolls which is less than that which would cause substantial orientation of the film during the coating and rewind operation.

12. A process as defined in claim 11 wherein the hot melt composition is applied at a temperature in the range of from about 180° to 210° F. to one surface of the polyethylene film while the other surface of said polyethylene film is being contacted with a surface maintained at a temperature in the range of about 140° to 170° F.

13. A process for producing an ink-transfer ribbon comprising passing a strip of low density, substantially unoriented polyethylene film from an unwind roll between a coating roll and a back-up roll to a rewind roll, applying a hot melt, pigmented, wax-base coating composition at a temperature of about 180° to 210° F. to one surface of said film by means of said coating roll while maintaining the temperature of said back-up roll at about 140° to 170° F. and maintaining a tension on the film between said rolls which is less than that which would cause substantial orientation of the film during the coating and rewinding operation.

14. The process of claim 13 wherein the hot melt composition is applied at a temperature of approximately 200° F. while the temperature of the back-up roll is maintained at about 145° to 155° F.

15. The process of claim 13 including the additional step of slitting the coated strip into a plurality of ribbons while applying a tension less than that which would cause substantial orientation of the film.

References Cited

UNITED STATES PATENTS

| | | | |
|---|---|---|---|
| 2,170,140 | 8/1939 | Grupe | 117—36.4 |
| 2,830,689 | 4/1958 | Clancy et al. | 117—36.3 |
| 2,995,460 | 8/1961 | Ritzerfeld et al. | 117—36.1 |
| 3,061,454 | 10/1962 | Graf et al. | 117—36.1 |
| 3,084,449 | 4/1963 | Huffman | 117—36.1 |

MURRAY KATZ, *Primary Examiner.*

U.S. Cl. X.R.

117—138.8; 197—172